United States Patent [19]

Morlino et al.

[11] Patent Number: 5,429,718
[45] Date of Patent: Jul. 4, 1995

[54] POLYGLYCEROL ANTIFOAM AGENTS IN PAPER PROCESSING

[75] Inventors: Nancy M. Morlino, Mahwah; Philip G. Sweeny, Hackettstown; Brian D. Curham, Clinton, all of N.J.

[73] Assignee: Lonza Inc., Fair Lawn, N.J.

[21] Appl. No.: 152,441

[22] Filed: Nov. 12, 1993

[51] Int. Cl.$^6$ ............................................. D21C 3/20
[52] U.S. Cl. ...................... 162/72; 162/158; 162/179; 162/70; 162/76; 162/190; 252/321
[58] Field of Search ............... 162/72, 158, 179, 70, 162/76, 190; 252/321

[56] References Cited

U.S. PATENT DOCUMENTS 3,994,770 11/1976 Lausch ...................... 162/8
4,009,119 2/1977 Poschmann et al. .
4,895,681 1/1990 Herrmann et al. ............ 260/410.6
4,950,420 8/1990 Svarz .
4,968,448 11/1990 Svarz ...................... 252/321

FOREIGN PATENT DOCUMENTS 2074054 7/1992 Canada .
57-063108 4/1982 Japan .

OTHER PUBLICATIONS

GB 928528 Abstract of Great British Patent Application.
4007985 Abstract of Danish Patent Application.
62100554 Abstract of Japanese Patent Application.
61227756 Abstract of Japanese Patent Application.
0402057 Abstract of Japanese Patent Application.
60262827 Abstract of Japanese Patent Application.
58047500 Abstract of Japanese Patent Application.
57068799 Abstract of Japanese Patent Application.

*Primary Examiner*—W. Gary Jones
*Assistant Examiner*—Mark De Simone
*Attorney, Agent, or Firm*—Darby & Darby

[57] ABSTRACT

Polyglycerol esters have been found to be effective antifoam agents in aqueous systems employed in paper processing. Adjunct antifoam agents are not required. Best results are obtained with polyglycerol esters having a degree of glycerine polymerization in the range of 3 to 6 and an esterification range of 15 to 85%.

7 Claims, No Drawings

POLYGLYCEROL ANTIFOAM AGENTS IN PAPER PROCESSING

BACKGROUND OF THE INVENTION

The present invention is concerned with the foaming problem encountered in the paper industry. By way of example, such steps as pulp cooking, the beating of paper stock, closed water circulation in paper machines, dispersing of pigments for paper making, and paper coating all give rise to foaming problems.

Various antifoam agents have been suggested for the paper industry. U.S. Pat. No. 4,950,420 discloses the use of a surfactant polyether together with a fatty ester of a polyhydric alcohol, such as a mono- or diester- of polyethylene glycol. Unfortunately, such polyethylene glycol ester defoamers containing 1,4-dioxane which may present a safety hazard.

Certain prior art patents deal with antifoam agents based on oil-in-water emulsions. For example, EP-A-O 140812 discloses such an oil-in-water emulsion wherein the oil phase contains a $C_{12}$ to $C_{22}$ alcohol, a fatty ester of a $C_{12}$ to $C_{22}$ carboxylic acid, and a trihydric $C_1$ to $C_{18}$ alcohol. Similarly, EP-A-O 322830 discloses an oil-in-water emulsion containing its oil phase:

(a) a $C_{12}$ or greater alcohol, fatty esters of alcohols of not less than 22 carbon atoms and $C_1$ to $C_{36}$ carboxylic acids and/or;

(b) a fatty ester of a $C_{12}$ to $C_{22}$ carboxylic acid with a monohydric to trihydric $C_1$ to $C_{18}$ alcohol, together with;

(c) a mixture of polyglycerol esters derived from 15 to 40 wt % diglycerol, 30 to 55 wt % triglycerol and 10 to 25 wt % tetraglycerol. Minor amounts of other polyglycerols may also be esterified. The use of such emulsified multipart systems while effective necessitates several formulation and emulsification steps for product production. Such emulsions typically have limited stability and must be used in a relatively short period of time.

Thus there is a significant need for a single phase, 1,4-dioxane free defoaming agent effective in aqueous paper processing operations.

BRIEF DESCRIPTION OF THE INVENTION

It has now been found that certain polyglycerol esters serve as effective antifoam defoam and deaerating agents for the processing of paper in aqueous systems. Preferred polyglycerol esters have 3 to 6 glycerol units and a 15 to 85% degree of esterification. $C_{12}$ to $C_{16}$ fatty acids, such as laurates and oleates, are the preferred source of ester groups. Such a single component, single phase 1,4-dioxane free product is a marked improvement for paper processing over the multipart systems of the prior art.

DETAILED DESCRIPTION OF THE INVENTION

The present polyglycerol esters are effective antifoam agents where paper is processed in an aqueous system. Typical examples of such processing steps include the following: cooking of paper pulp; dispensing of pigments in paper-making; beating of paper stock; paper-making in a closed circulation system; paper coating; and use of recirculation water to carry pulp.

The polyglycerol esters have a degree of polymerization of from 3 to 10, preferably 3 to 6 glycerol units. Examples include triglycerols, tetraglycerols, pentaglycerols, hexaglycerols, heptaglycerols, octaglycerols, nonaglycerols and decaglycerols. In addition, these polyglycerol esters have a degree of esterification of from 15 to 85%, preferably from 30 to 80%. Most desirable are laurate esters having 50% esterification. The degree of esterification is the number of hydroxyl sites which are esterified divided by the total number of hydroxyl sites multiplied by 100.

The present antifoam agents are derived from $C_{12}$ to $C_{18}$ fatty acids. The fatty acid may have straight or branched alkyl chains. Saturated fatty acids such as lauric, palmitic, stearic, myristic, and isostearic may be used. Unsaturated acids which are also suitable include oleic, hexadecenoic acid, and linoleic acid. Those derived from lauric acid are especially preferred.

The polyglycerol ester antifoam agent is added to the paper processing step in an amount of 1 to 200 ppm, preferably 5 to 30 ppm, based on the recirculating water mass.

The present antifoam agent is added to the aqueous paper processing by conventional means at any stage prior to or at the foam generation site. For example, the antifoam agent may be added via a shower in the machine chest, stuff box, saveall or any other accessible area.

The various aspects of the present invention will be made more clearly apparent by reference to the following examples. All percentages are on a weight basis unless indicated otherwise. All publications and test methods mentioned herein are incorporated by reference.

EXAMPLES

In the following examples, various polyglycerol esters were tested for their ability to inhibit foam in an aqueous paper processing operation.

Experiments were performed in a standard dynamic foam test apparatus which recirculates 200 ml synthetic white water for 15 minutes at a temperature of 55° C. and a pH of from 7.3 to 7.5. The synthetic white water contains rosin, starch, alum, cellulose and calcium carbonate in tap water and simulates recirculation water used in the paper industry. Ten ppm of the polyglycerol esters identified in Table 1 were injected into samples of the white water. The test procedure consisted of operating the dynamic foam apparatus until an equilibrium foam height was achieved. The time for the foam to reach the initial equilibrium foam height was determined.

TABLE 1

POLYGLYCEROL ESTERS AS WHITE WATER ANTIFOAM AGENTS

| POLYGLYCEROL ESTER | % ESTERIFICATION | TIME TO REACH MAXIMUM FOAM HEIGHT, SECONDS |
|---|---|---|
| None (control) | — | 45 |
| Decaglyceryl monolaurate | 8 | 45 |
| Hexaglyceryl monooleate | 13 | 45 |
| Triglyceryl monolaurate | 20 | 75 |
| Triglyceryl monooleate | 20 | 60 |
| Triglyceryl (2.5) laurate[1] | 50 | 180 |
| Hexaglyceryl tetralaurate | 50 | 150 |
| Hexaglyceryl tetraoleate | 50 | 165 |
| Decaglyceryl hexaoleate | 50 | 75 |

TABLE 1-continued

POLYGLYCEROL ESTERS AS WHITE WATER ANTIFOAM AGENTS

| POLYGLYCEROL ESTER | % ESTERIFICATION | TIME TO REACH MAXIMUM FOAM HEIGHT, SECONDS |
|---|---|---|
| Triglyceryl tetralaurate | 80 | 120[2] |
| Triglyceryl tetraoleate | 80 | 60 |
| Hexaglyceryl (6.5) laurate[3] | 81 | 120 |
| Decaglyceryl decalaurate | 83 | 90 |
| Decaglyceryl decaoleate | 83 | 45 |

[1] Indicating an average of 2.5 moles of laurate for each mole of triglycerol
[2] Average of two runs
[3] Indicating an average of 6.5 moles of laurate for each mole of hexaglycerol Table 1 illustrates the antifoam effectiveness of the present polyglycerol esters. In the absence of the esters, the white water rapidly attained its maximum foam height in 45 seconds. In contrast, when the preferred esters of the present invention were added, as much as a four-fold improvement to 180 seconds was realized (triglyceryl (2.5) laurate). Over a 2.5-fold improvement (120 seconds or longer) was realized by the use of: hexaglyceryl tetraoleate, triglyceryl (2.5) laurate, triglyceryl tetralaurate, hexaglyceryl tetralaurate, and hexaglyceryl (6.5) laurate.

The above examples are intended to be illustrative of the instant invention and should not be construed as limiting the scope thereof. Many modifications of the foregoing will be apparent to those skilled in the art which do not depart from the spirit of the invention.

We claim:

1. A method for inhibiting foam formation in a recirculating aqueous paper processing system which consists essentially of adding as a single-phase antifoam agent from 1 to 200 ppm of a polyglycerol ester agent to said recirculating aqueous systems, said polyglycerol ester being derived from a linear or a branched $C_{12}$ to $C_{18}$ fatty acid having from 3 to 6 glycerol units and a degree of esterification of from 30 to 80%.

2. The method of claim 1 wherein said polyglycerol ester is an oleate or a laurate ester.

3. The method of claim 1 wherein said polyglycerol ester is triglyceryl 2,5 laurate.

4. The method of claim 1 wherein said ester is a triglycerol.

5. The method of claim 1 wherein said ester is a hexaglycerol.

6. The method of claim 1 wherein said ester is a laurate ester.

7. The method of claim 6 wherein the ester is 50% esterified.

* * * * *